United States Patent
Takahashi et al.

(10) Patent No.: US 7,332,147 B2
(45) Date of Patent: Feb. 19, 2008

(54) PROCESS FOR REFORMING HYDROCARBONS WITH CARBON DIOXIDE BY THE USE OF A SELECTIVELY PERMEABLE MEMBRANE REACTOR

(75) Inventors: Akira Takahashi, Nagoya (JP); Nobuhiko Mori, Nagoya (JP); Toshiyuki Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 22 days.

(21) Appl. No.: 11/497,967

(22) Filed: Aug. 2, 2006

(65) Prior Publication Data
US 2006/0269471 A1 Nov. 30, 2006

Related U.S. Application Data

(63) Continuation of application No. PCT/JP2005/001666, filed on Feb. 4, 2005.

(30) Foreign Application Priority Data
Feb. 9, 2004 (JP) .............................. 2004-031846

(51) Int. Cl.
C01B 3/26 (2006.01)
(52) U.S. Cl. ...................................... 423/651; 423/652
(58) Field of Classification Search ................ 423/650, 423/651, 652, 653, 654
See application file for complete search history.

(56) References Cited
U.S. PATENT DOCUMENTS
6,090,312 A * 7/2000 Ziaka et al. ................. 252/373
6,228,147 B1 5/2001 Takahashi
6,919,062 B1 * 7/2005 Vasileiadis et al. ........ 423/437.1

FOREIGN PATENT DOCUMENTS

| JP | 05-147902 A1 | 6/1993 |
|---|---|---|
| JP | 10-259002 A1 | 9/1998 |
| JP | 2004-149332 A1 | 5/2004 |
| JP | 2005-058823 A1 | 3/2005 |

OTHER PUBLICATIONS

Savvas Vasileiadis et al., "*Alternative Generation of $H_2$, Co and $H_2$, $CO_2$ Mixtures from Steam-Carbon Dioxide Reforming of Methane and the Water Gas Shift with Permeable (Membrane) Reactors,*" Chemical Engineering Communication, 1999, vol. 176, pp. 247-252, no month.

(Continued)

Primary Examiner—Wayne A. Langel
(74) Attorney, Agent, or Firm—Burr & Brown

(57) ABSTRACT

A process is provided for reforming a hydrocarbon with carbon dioxide using a selectively permeable membrane reactor including a catalyst for accelerating a chemical reaction and a selectively permeable membrane exhibiting selective permeability, wherein a carbon dioxide reforming reaction of the hydrocarbon is accelerated by the catalyst to produce reaction products, and a specific component among the reaction products is allowed to pass through the selectively permeable membrane so specific component is selectively separated. The process includes the steps of adding steam to a raw material gas containing the hydrocarbon and the carbon dioxide and supplying the raw material gas mixture to the selectively permeable membrane reactor.

1 Claim, 1 Drawing Sheet

OTHER PUBLICATIONS

A.A. Ponelis et al., "$CO_2$ *Reforming of Methane in a Membrane Reactor*," Studies in Surface Science and Catalysis, 1997, vol. 107, pp. 555-560, no month.

Eiichi Kikuchi, "*Suiso—Gosei Gas Seizo to Membrane Reactor*," Dai 69 Kai Hokkaido Sekitan Kenkyukai Koenkai, Aug. 25, 2000, pp. 34-43.

Nobuhiko Mori et al., "*Suijoki Kaishitsu Membrane Reactor ni Okeru Bunrimaku to Shokubai no Kumiawase no Kenkyu Sono 1*," The Society of Chemical Engineers, Japan Dai 69 Nenkai Kenkyu Happyo Koen Yoshishu, Mar. 2, 2004, p. 593.

Kikuchi, Eiichi, "Palladium/ceramic membranes for selective hydrogen permeation and their application to membrane reactor," *Catalysis Today*, 25 (1995), pp. 333-337.

Kikuchi, Eiichi, "Steam Reforming and Related Reactions in Hydrogen-permselective Membrane Reactor," *Sekiyu Gakkaishi*, 39, (5), pp. 301-313.

\* cited by examiner

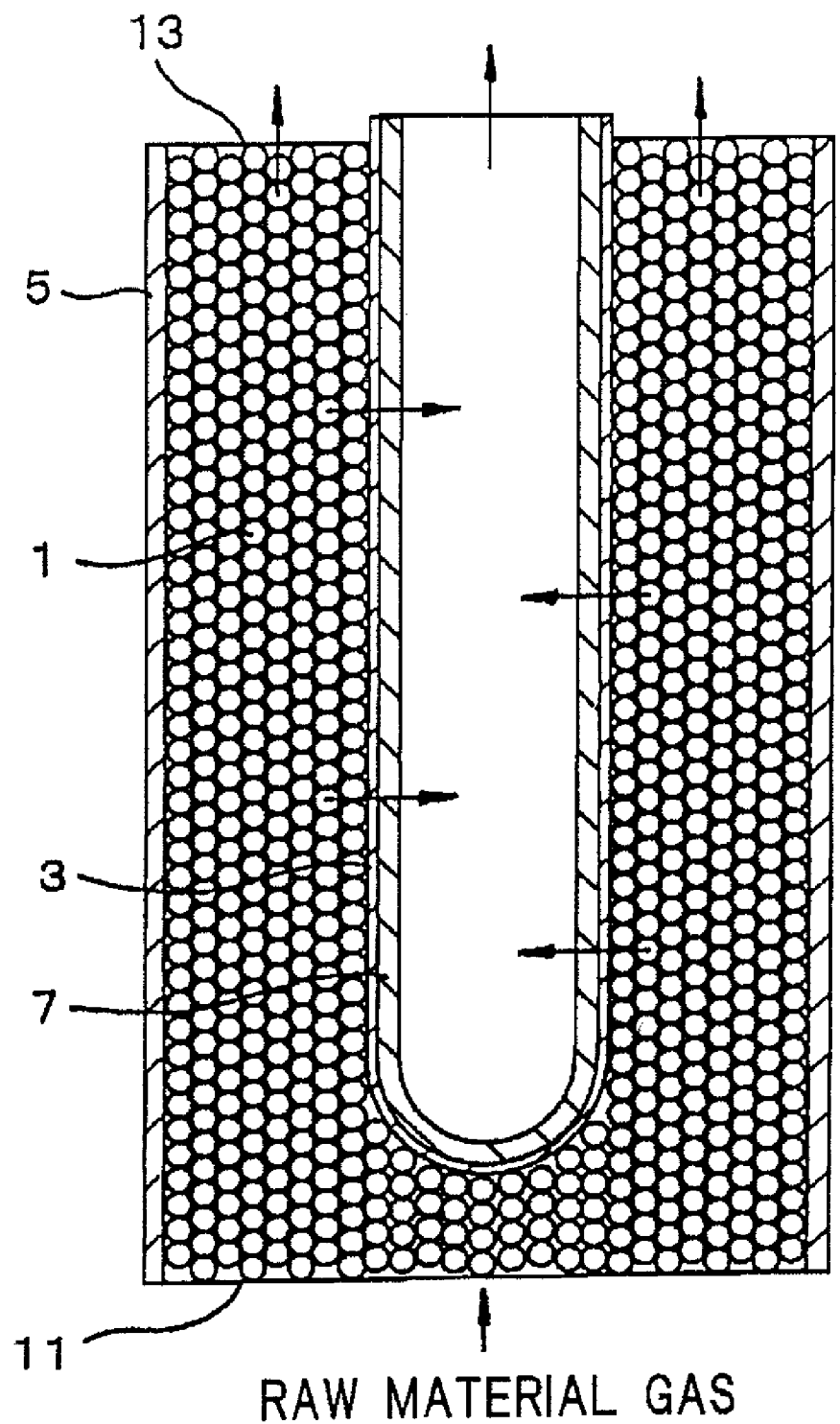
RAW MATERIAL GAS

PROCESS FOR REFORMING HYDROCARBONS WITH CARBON DIOXIDE BY THE USE OF A SELECTIVELY PERMEABLE MEMBRANE REACTOR

TECHNICAL FIELD

The present invention relates to a process for carrying out a carbon dioxide reforming reaction of a hydrocarbon using a selectively permeable membrane reactor.

BACKGROUND ART

A reaction between a hydrocarbon such as methane or propane and steam or carbon dioxide is called a reforming reaction, which has been industrially carried out as means for obtaining a synthesis gas (hydrogen and carbon monoxide) or hydrogen used as fuel for fuel cells. A catalyst containing a noble metal such as nickel, ruthenium, rhodium, or platinum as an active component is generally used for the reforming reaction in order to accelerate the reaction. Since the reforming reaction is an endothermic reaction, a high temperature of 700° C. or more is generally required.

In recent years, a selectively permeable membrane reactor (membrane reactor) which allows reaction and separation to occur at the same time has been used to produce hydrogen or the like through the reforming reaction and to separate the reaction product. The selectively permeable membrane reactor includes a catalyst for accelerating a chemical reaction and a selectively permeable membrane exhibiting selective permeability, and allows a chemical reaction using the catalyst and separation of the reaction product using the selectively permeable membrane to occur at the same time. Therefore, the selectively permeable membrane reactor has a compact device configuration and requires only a small installation area. Moreover, since the reaction product passes through the selectively permeable membrane and is removed from the reaction system, the equilibrium of the chemical reaction shifts toward the production side, whereby the reaction can occur at a lower temperature. This reduces the consumption of energy during the reaction and prevents deterioration of the constituent material of the reactor.

As the reforming reaction using the selectively permeable membrane reactor, a steam reforming reaction of methane (see non-patent document 1, for example) and a carbon dioxide reforming reaction of methane (see non-patent document 2, for example) have been carried out and showed a conversion rate equal to or higher than the equilibrium.

Non-patent document 1: Eiichi Kikuchi, Catalysis Today, 25 (1995) 333-337

Non-patent document 2: Eiichi Kikuchi, Sekiyu Gakkaishi, 39, (5) (1996) 301-313

In a carbon dioxide reforming reaction of a hydrocarbon such as methane, the catalyst is significantly inactivated due to deposition of coke (coking) during the reaction. In particular, since coking occurs to a large extent when using the selectively permeable membrane reactor in comparison with the case of using a normal reactor, the conversion rate significantly decreases within a short time, thereby making it difficult to stably carry out the reforming reaction over a long time. In recent years, effective utilization of a biomass gas and a low-quality natural gas field has been demanded from the viewpoint of reducing carbon dioxide. Therefore, it is an important technical subject to efficiently carry out a reforming reaction using a selectively permeable membrane reactor utilizing a mixed gas containing a hydrocarbon obtained from the above source and carbon dioxide.

SUMMARY OF THE INVENTION

The present invention was achieved in view of the above-described situation. An object of the present invention is to prevent inactivation of the catalyst due to coking when carrying out a carbon dioxide reforming reaction of a hydrocarbon and separating a specific component such as hydrogen using the selectively permeable membrane reactor to allow the reaction to be efficiently and stably carried out over a long time.

The present invention provides a process for reforming a hydrocarbon with carbon dioxide using a selectively permeable membrane reactor including a catalyst for accelerating a chemical reaction and a selectively permeable membrane exhibiting selective permeability, wherein a carbon dioxide reforming reaction of the hydrocarbon is accelerated by the catalyst and a specific component among reaction products produced by the reaction is selectively separated by allowing the specific component to pass through the selectively permeable membrane, the process comprising adding steam to a raw material gas containing the hydrocarbon and the carbon dioxide and supplying the mixture to the selectively permeable membrane reactor.

According to the present invention, inactivation of the catalyst due to coking can be reduced when carrying out the carbon dioxide reforming reaction of the hydrocarbon using the permeable membrane reactor, whereby the reaction can be efficiently and stably carried out over a long time. The present invention may be applied for a carbon dioxide reforming reaction of various hydrocarbons such as methane, ethane, propane, butane, kerosine, methanol, and diethyl ether, and is expected to provide a technology for effectively utilizing a biomass gas and a low-quality natural gas field.

BRIEF DESCRIPTION OF THE DRAWINGS

The drawing figure is a cross-sectional schematic view showing an example of the structure of the selectively permeable membrane reactor used in the present invention.

EXPLANATION OF SYMBOLS USED IN THE DRAWING FIGURE

The reference symbols used in the drawing figure are as follows: 1 catalyst; 3 selectively permeable membrane; 5 reaction tube; 7 separation tubes; 11 inlet; and 13 outlet.

DETAILED DESCRIPTION OF THE INVENTION

As described above, the present invention provides a process for reforming a hydrocarbon with carbon dioxide using a selectively permeable membrane reactor including a catalyst for accelerating a chemical reaction and a selectively permeable membrane exhibiting selective permeability, wherein a carbon dioxide reforming reaction of the hydrocarbon is accelerated by the catalyst and a specific component among reaction products produced by the reaction is selectively separated by allowing the specific component to pass through the selectively permeable membrane, the process including adding steam to a raw material gas containing the hydrocarbon and the carbon dioxide and supplying the mixture to the selectively permeable membrane reactor.

In the process for reforming a hydrocarbon with carbon dioxide using a selectively permeable membrane reactor according to the present invention, since deposition of coke (coking) in the selectively permeable membrane reactor is reduced by adding steam to the raw material gas containing the hydrocarbon and the carbon dioxide, inactivation of the catalyst due to coking is reduced, whereby the catalytic performance is maintained over a long time so that stable reaction continuously occurs.

The drawing FIG. is a cross-sectional schematic view showing an example of the structure of the selectively permeable membrane reactor used in the present invention. This selectively permeable membrane reactor includes a reaction tube 5 having a gas inlet 11 on one end and a gas outlet 13 on the other end, a separation tube 7 inserted into the reaction tube 5 and having a selectively permeable membrane 3 on its surface, and a catalyst 1 provided between the reaction tube 5 and the separation tube 7. The catalyst 1 is in the shape of pellets and is provided in the opening between the reaction tube 5 and the separation tube 7. A raw material gas supplied through the inlet 11 contacts the catalyst 1 and undergoes a carbon dioxide reforming reaction or the like to produce the target gas such as hydrogen.

The following chemical formulas (1) to (3) indicate the reactions which occur in the selectively permeable membrane reactor when using methane as the hydrocarbon in the present invention. In the present invention, when adding steam to the raw material gas containing the hydrocarbon and carbon dioxide and supplying the mixture to the selectively permeable membrane reactor, a carbon dioxide reforming reaction of the chemical formula (1) and a steam reforming reaction of the chemical formula (2) occur in the selectively permeable membrane reactor. A shift reaction (reverse-shift reaction) of the chemical formula (3) also occurs simultaneously with the reforming reactions, whereby hydrogen, carbon monoxide, and carbon dioxide are produced:

$$CH_4 + CO_2 \rightarrow 2CO + 2H_2 \quad (1);$$

$$CH_4 + H_2O \rightarrow CO + 3H_2 \quad (2); \text{and}$$

$$CO + H_2O \leftrightarrow CO_2 + H_2 \quad (3).$$

A specific component (e.g. hydrogen) among the reaction products selectively passes through the selectively permeable membrane 3 to enter the separation tube 7 (i.e. separated from other components) and is removed. The components which do not pass through the selectively permeable membrane 3 are discharged to the outside of the reactor through the outlet 13.

In the present invention, various hydrocarbons other than methane ($CH_4$), such as ethane ($C_2H_6$), propane ($C_3H_8$), butane ($C_4H_{10}$), methanol ($CH_3OH$), and dimethyl ether ($CH_3OCH_3$), may also be used. A single type of hydrocarbon or a mixture of two or more types of hydrocarbons may be used.

For example, when using methane as the hydrocarbon, the composition ratio (molar ratio) of carbon dioxide to methane ($CO_2/CH_4$) in the raw material gas is preferably 1.0 to 3.0, still more preferably 1.2 to 2.5, and even more preferably 1.5 to 2.0. If the composition ratio $CO_2/CH_4$ is less than the above range, significant coking occurs on the catalyst. If the composition ratio $CO_2/CH_4$ exceeds the above range, since a large amount of $CO_2$ is supplied, the amount of energy required to heat the selectively permeable membrane reactor to a specific operating temperature is increased.

The composition ratio (molar ratio) of steam ($H_2O$) added to the raw material gas to carbon dioxide ($H_2O/CO_2$) is preferably 0.01 to 1.0, still more preferably 0.1 to 0.5, and even more preferably 0.2 to 0.3. If the composition ratio $H_2O/CO_2$ is less than the above range, a sufficient coking reduction effect may not be obtained due to a small amount of steam. If the composition ratio $H_2O/CO_2$ exceeds the above range, since the amount of steam is too great, the amount of energy required to heat the selectively permeable membrane reactor to a specific operating temperature is increased.

In the present invention, as the catalyst used for the selectively permeable membrane reactor, nickel (Ni) or the like, which has been used for an industrial reforming reaction, may be used. Note that it is preferable to use a noble metal catalyst, such as platinum (Pt), rhodium (Rh), or ruthenium (Ru), which exhibits a coking resistance higher than that of a base metal catalyst such as nickel.

The catalyst is preferably used in a state in which the catalyst is supported on the surface of a porous carrier such as silica ($SiO_2$), alumina ($Al_2O_3$), titania ($TiO_2$), or zirconia ($ZrO_2$). It is particularly preferable to use zirconia. It is considered that steam and carbon dioxide are activated on the surface of zirconia. Therefore, a catalytic reaction on the carrier is accelerated by using zirconia as the carrier for the catalyst, whereby coking can be reduced.

The material for the selectively permeable membrane is not particularly limited insofar as the material allows the target specific component such as hydrogen to pass through, such as an inorganic porous membrane made of zeolite or silica or a metal membrane made of palladium or the like. For example, when separating hydrogen, it is preferable to use a metal membrane made of palladium or a palladium alloy which exhibits hydrogen permeability and selectivity higher than those of other membranes.

The reaction temperature when carrying out the present invention is preferably 300 to 800° C., and still more preferably 400 to 600° C. In the reforming reaction using the selectively permeable membrane reactor, since some of the reaction products pass through the selectively permeable membrane and are removed from the reaction system, the equilibrium of the chemical reaction shifts toward the production side, whereby the reaction can occur at a low temperature, as described above.

The inside of the selectively permeable membrane reactor is divided into the space in which the reaction is carried out (the space between the reaction tube 5 and the separation tube 7 in the example shown in FIG. 1) and the space into which the specific component among the reaction products is introduced through the selectively permeable membrane (inside the separation tube 7 in the example shown in FIG. 1), which are separated by the selectively permeable membrane. It is preferable that the pressure inside the space in which the reaction is carried out (reaction-side pressure) be 1 to 9 atm (101.3 to 911.9 kPa), and still more preferably 1 to 5 atm (101.3 to 506.6 kPa) in order to increase the rate at which the product gas passes through the selectively permeable membrane and the conversion rate of the raw material gas into the product gas. It is preferable that the pressure inside the space into which the specific component is introduced through the selectively permeable membrane (permeation-side pressure) be 6 atm (608 kPa) or less, and still more preferably 3 atm (304 kPa) or less in order to increase the rate at which the product gas passes through the selectively permeable membrane.

EXAMPLES

The present invention is described below in more detail by way of examples. Note that the present invention is not limited the following examples.

Comparative Example 1

A reaction was carried out in the same manner as in Example 1 except for supplying methane and carbon dioxide at a molar ratio of $CO_2/CH_4=1.0$ without supplying steam. The conversion rate of methane was measured in the initial stage of the reaction and two days after initiation of the reaction. The results are shown in Table 1.

TABLE 1

|  | Example 1 | Example 2 | Example 3 | Comparative Example 1 |
| --- | --- | --- | --- | --- |
| Reaction temperature (° C.) | 550 | 550 | 550 | 550 |
| $CO_2/CH_4$ | 1 | 1 | 1 | 1 |
| $H_2O/CO_2$ | 0.05 | 0.1 | 0.3 | 0 |
| Selectively permeable membrane | Pd membrane | Pd membrane | Pd membrane | Pd membrane |
| Reaction-side pressure (atm) | 1 | 1 | 1 | 1 |
| Permeation-side pressure (atm) | 0.1 | 0.1 | 0.1 | 0.1 |
| $CH_4$ flow rate (ml/min) | 100 | 100 | 100 | 100 |
| $CH_4$ conversion rate in initial stage (%) | 51 | 54 | 55 | 50 |
| $CH_4$ conversion rate after two days (%) | 35 | 50 | 52 | 16 |

Example 1

A selectively permeable membrane reactor having a structure as shown in FIG. 1 was produced using a palladium membrane as the selectively permeable membrane (hydrogen permeable membrane) and a catalyst in which platinum was supported on the surface of a zirconia carrier in the shape of pellets. A raw material gas containing methane, carbon dioxide, and steam was supplied to the selectively permeable membrane reactor at a molar ratio of $CO_2/CH_4=1.0$ and $H_2O/CO_2=0.05$ to effect a carbon dioxide reforming reaction of methane and a reaction occurring along with the reforming reaction to separate hydrogen from the reaction products. The reaction temperature was 550° C., the reaction-side pressure was 1 atm (101.3 kPa), and the permeation-side pressure was 0.1 atm (10.1 kPa). The flow rate of the raw material gas was adjusted so that the flow rate of methane was 100 ml/min. The conversion rate of methane was measured in the initial stage of the reaction (30 minutes after the reaction) and two days after initiation of the reaction. The results are shown in Table 1.

Example 2

A reaction was carried out in the same manner as in Example 1 except for supplying methane, carbon dioxide, and steam at a molar ratio of $CO_2/CH_4=1.0$ and $H_2O/CO_2=0.1$. The conversion rate of methane was measured in the initial stage of the reaction and two days after initiation of the reaction. The results are shown in Table 1.

Example 3

A reaction was carried out in the same manner as in Example 1 except for supplying methane, carbon dioxide, and steam at a molar ratio of $CO_2/CH_4=1.0$ and $H_2O/CO_2=0.3$. The conversion rate of methane was measured in the initial stage of the reaction and two days after initiation of the reaction. The results are shown in Table 1.

Example 4

A reaction was carried out in the same manner as in Example 1 except for supplying methane, carbon dioxide, and steam at a molar ratio of $CO_2/CH_4=3.0$ and $H_2O/CO_2=0.05$. The conversion rate of methane was measured in the initial stage of the reaction and two days after initiation of the reaction. The results are shown in Table 2.

Example 5

A reaction was carried out in the same manner as in Example 1 except for supplying methane, carbon dioxide, and steam at a molar ratio of $CO_2/CH_4=3.0$ and $H_2O/CO_2=0.1$. The conversion rate of methane was measured in the initial stage of the reaction and two days after initiation of the reaction. The results are shown in Table 2.

Example 6

A reaction was carried out in the same manner as in Example 1 except for supplying methane, carbon dioxide, and steam at a molar ratio of $CO_2/CH_4=3.0$ and $H_2O/CO_2=0.3$. The conversion rate of methane was measured in the initial stage of the reaction and two days after initiation of the reaction. The results are shown in Table 2.

Comparative Example 2

A reaction was carried out in the same manner as in Example 1 except for supplying methane and carbon dioxide at a molar ratio of $CO_2/CH_4=3.0$ without supplying steam. The conversion rate of methane was measured in the initial stage of the reaction and two days after initiation of the reaction. The results are shown in Table 2.

TABLE 2

|  | Example 4 | Example 5 | Example 6 | Comparative Example 2 |
|---|---|---|---|---|
| Reaction temperature (° C.) | 550 | 550 | 550 | 550 |
| $CO_2/CH_4$ | 3 | 3 | 3 | 3 |
| $H_2O/CO_2$ | 0.05 | 0.1 | 0.3 | 0 |
| Selectively permeable membrane | Pd membrane | Pd membrane | Pd membrane | Pd membrane |
| Reaction-side pressure (atm) | 1 | 1 | 1 | 1 |
| Permeation-side pressure (atm) | 0.1 | 0.1 | 0.1 | 0.1 |
| $CH_4$ flow rate (ml/min) | 100 | 100 | 100 | 100 |
| $CH_4$ conversion rate in initial stage (%) | 63 | 63 | 64 | 62 |
| $CH_4$ conversion rate after two days (%) | 50 | 60 | 62 | 34 |

As shown in Tables 1 and 2, the difference in the conversion rate of methane between the initial stage of the reaction and two days after initiation of the reaction was small in Examples 1 to 6 in comparison with Comparative Examples 1 and 2. This suggests that inactivation of the catalyst due to coking was reduced by adding steam. In particular, the difference in the conversion rate of methane between the initial stage of the reaction and two days after initiation of the reaction was significantly small in Examples 2, 3, 5, and 6, in which the ratio of steam to carbon dioxide ($H_2O/CO_2$) was 0.1 to 0.3. A high conversion rate was generally obtained when the ratio of carbon dioxide to methane ($CO_2/CH_4$) was 3.0 in comparison with the case where the ratio of carbon dioxide to methane ($CO_2/CH_4$) was 1.0. In Comparative Examples 1 and 2, the conversion rate of methane was significantly decreased two days after initiation of the reaction in comparison with the conversion rate of methane in the initial stage of the reaction. When the state of the catalyst was observed after completion of the reaction, it was confirmed that coke was deposited on the catalyst.

INDUSTRIAL APPLICABILITY

The present invention may be suitably used as means for obtaining a synthesis gas, hydrogen used as fuel for fuel cells, and the like by carrying out a carbon dioxide reforming reaction of a hydrocarbon using the selectively permeable membrane reactor.

The invention claimed is:

1. A process for reforming a hydrocarbon with carbon dioxide using a selectively permeable membrane reactor including a catalyst for accelerating a chemical reaction and a selectively permeable membrane exhibiting selective permeability, wherein a carbon dioxide reforming reaction of the hydrocarbon is accelerated by the catalyst to produce reaction products including hydrogen, and the hydrogen is allowed to pass through the selectively permeable membrane so that the hydrogen is selectively separated from the reaction products, the process comprising the steps of:

adding steam to a raw material gas containing the hydrocarbon and the carbon dioxide to form a raw material gas mixture; and supplying the raw material gas mixture to the selectively permeable membrane reactor;

wherein the hydrocarbon is methane, a molar composition ratio of the carbon dioxide to the methane ($CO_2/CH_4$) in the raw material gas mixture is 1.0 to 3.0, and a molar composition ratio of the steam to the carbon dioxide ($H_2O/CO_2$) is 0.01 to 0.3.

* * * * *